US009277518B2

(12) United States Patent
Kim et al.

(10) Patent No.: US 9,277,518 B2
(45) Date of Patent: Mar. 1, 2016

(54) SYNCHRONIZATION METHOD AND APPARATUS IN DEVICE-TO-DEVICE DIRECT COMMUNICATION

(71) Applicant: Electronics and Telecommunications Research Institute, Daejeon (KR)

(72) Inventors: Hyung Jin Kim, Daejeon (KR); Chanho Yoon, Daejeon (KR); Soojung Jung, Daejeon (KR); Sung Kyung Kim, Daejeon (KR); Seungkwon Cho, Gyeonggi-do (KR); Sung Cheol Chang, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 172 days.

(21) Appl. No.: 14/165,017

(22) Filed: Jan. 27, 2014

(65) Prior Publication Data

US 2014/0211781 A1    Jul. 31, 2014

(30) Foreign Application Priority Data

Jan. 25, 2013 (KR) .......... 10-2013-0008815
Jan. 24, 2014 (KR) .......... 10-2014-0008729

(51) Int. Cl.
*H04W 56/00* (2009.01)
*H04W 4/00* (2009.01)

(52) U.S. Cl.
CPC ........ *H04W 56/0025* (2013.01); *H04W 56/002* (2013.01); *H04W 4/005* (2013.01)

(58) Field of Classification Search
None
See application file for complete search history.

(56) References Cited

U.S. PATENT DOCUMENTS

| 2006/0240854 | A1* | 10/2006 | Lee ............... | H04W 56/002 455/502 |
| 2010/0226360 | A1* | 9/2010 | Li ................ | H04L 27/2656 370/350 |
| 2011/0149946 | A1* | 6/2011 | Gresset .......... | H04B 7/2687 370/350 |
| 2011/0182280 | A1* | 7/2011 | Charbit ......... | H04W 56/0045 370/350 |
| 2012/0050613 | A1* | 3/2012 | Halna Du Fretay .. | G06F 3/1438 348/513 |
| 2012/0163278 | A1 | 6/2012 | Chang et al. | |

FOREIGN PATENT DOCUMENTS

KR   10-2012-0048976 A   5/2012
KR   10-2012-0073147 A   7/2012

* cited by examiner

*Primary Examiner* — Min Jung
(74) *Attorney, Agent, or Firm* — Rabin & Berdo, P.C.

(57) ABSTRACT

A synchronization method by a device is provided in a device-to-device direct communication. The device receives synchronization signals from a plurality of other devices at a current frame, and estimates a synchronization time at a next frame based on the synchronization signals received from the other devices.

14 Claims, 6 Drawing Sheets

SYNCHRONIZATION METHOD AND APPARATUS IN DEVICE-TO-DEVICE DIRECT COMMUNICATION

CROSS-REFERENCE TO RELATED APPLICATION

This application claims priority to and the benefit of Korean Patent Application Nos. 10-2013-0008815 and 10-2014-0008729 filed in the Korean Intellectual Property Office on Jan. 25, 2013 and Jan. 24, 2014, the entire contents of which are incorporated herein by reference.

BACKGROUND OF THE INVENTION (a) Field of the Invention

The present invention generally relates to a synchronization method and apparatus for a device-to-device direct communication.

(b) Description of the Related Art

Conventional wireless communication systems use a master-slave synchronization scheme. In the master-slave synchronization scheme, one device becomes a master and transmits a reference signal, and the other devices adjust reference times based on the reference signal transmitted by the master. In a cellular system, a base station always operates as the master. However, because a direct communication between terminals can be performed under a circumstance where the base station does not exist, the master-slave synchronization scheme is not suitable for the cellular system.

In an ad-hoc network where there is no base station for operating as the master, the terminal senses carriers using a carrier sense multiple access (CSMA) scheme, and performs back-off during a predetermined time. After a timer expires, the terminal becomes the master and transmits a reference signal. In this case, consumption of resources for performing the back-off is inevitable. Furthermore, a terminal between the two master terminals may simultaneously receive two reference signals having the different synchronizations. Then, the terminal may encounter near-far problem increasing the interference.

SUMMARY OF THE INVENTION

An embodiment of the present invention provides a synchronization method and apparatus suitable for a device-to-device direct communication.

According to an embodiment of the present invention, a synchronization method by a device is provided in a device-to-device direct communication. The method includes receiving synchronization signals from a plurality of other devices at a current frame, and estimating a synchronization time at a next frame based on the synchronization signals received from the other devices.

Estimating the synchronization time may include detecting synchronization times at the current frame of the other devices from the synchronization signals received from the other devices, and estimating the synchronization time at the next frame based on information including the synchronization times at the current frame of the other devices.

Estimating the synchronization time may further include detecting received signal powers of the synchronization signals of the other devices at the current frame, from the synchronization signals received from the other devices. In this case, the information may further include the received signal powers of the synchronization signals of the other devices at the current frame.

The information may further include a synchronization time at the current frame of the device.

The information may further include a frame synchronization period of the device.

Estimating the synchronization time may include estimating the synchronization time at the next frame as expressed in a below equation:

$$t_i(n) + T_i + \varepsilon_0 \cdot \sum_{j=1, i \neq j}^{N} \alpha_{ij} \cdot (t_j(n) - t_i(n)).$$

Here, $t_i(n)$ indicates a synchronization time of the device at the current frame, $t_j(n)$ indicates a synchronization time of other device with an index j at the current frame, $T_i$ indicates a frame synchronization period of the device, $\varepsilon_0$ indicates a loop filter coefficient, and $\alpha_{ij}$ indicates received signal power weighting factor.

The received signal power weighting factor may be determined as $$\frac{P_{ij}}{\sum_{j \in I_i} P_{ij}}.$$

Here, $P_{ij}$ indicates a received signal power of a synchronization signal from the other device having the index j to the device, and $I_i$ indicates an index set of devices that have transmitted synchronization signals whose received signal power exceeds a threshold.

According to another embodiment of the present invention, a synchronization method by a device is provided in a device-to-device direct communication. The method includes determining whether a current frame is a start frame of a superframe, selecting a frame for transmitting a synchronization signal when the current frame is the start frame, determining whether the current frame is the frame for transmitting the synchronization signal when the current frame is not the start frame, receiving synchronization signals from a plurality of other devices to estimate a synchronization time when the current frame is not the frame for transmitting the synchronization signal, and transmitting a synchronization signal when the current frame is the frame for transmitting the synchronization signal.

Each of remaining frames except the start frame in the superframe may include a synchronization region for transmitting the synchronization signal or receiving the synchronization signals from the other devices.

Estimating the synchronization time may include detecting synchronization times at the current frame of the other devices from the synchronization signals received from the other devices, and estimating the synchronization time at the next frame based on information including the synchronization times at the current frame of the other devices.

Estimating the synchronization time may further include detecting received signal powers of the synchronization signals of the other devices at the current frame, from the synchronization signals received from the other devices. In this case, the information may further include the received signal powers of the synchronization signals of the other devices at the current frame.

The information may further include a synchronization time at the current frame of the device.

The information may further include a frame synchronization period of the device.

The frame synchronization period may be equal to a length of the superframe.

According to yet another embodiment of the present invention, a synchronization apparatus is provided in a device-to-device direct communication. The apparatus includes a transceiver configured to receive synchronization signals from a plurality of other devices at a current frame, and a controller configured to estimate a synchronization time at a next frame based on the synchronization signals received from the other devices.

The controller may detect synchronization times at the current frame of the other devices from the synchronization signals received from the other devices, and estimates the synchronization time at the next frame based on information including the synchronization times at the current frame of the other devices.

The controller may detect received signal powers of the synchronization signals of the other devices at the current frame, from the synchronization signals received from the other devices. In this case, the information may further include the received signal powers of the synchronization signals of the other devices at the current frame.

The information may further include a synchronization time at the current frame of the device.

The information may further include a frame synchronization period of the device.

The transceiver may receive the synchronization signals at frames except a start frame in a superframe.

DETAILED DESCRIPTION OF THE EMBODIMENTS

Figure 1:
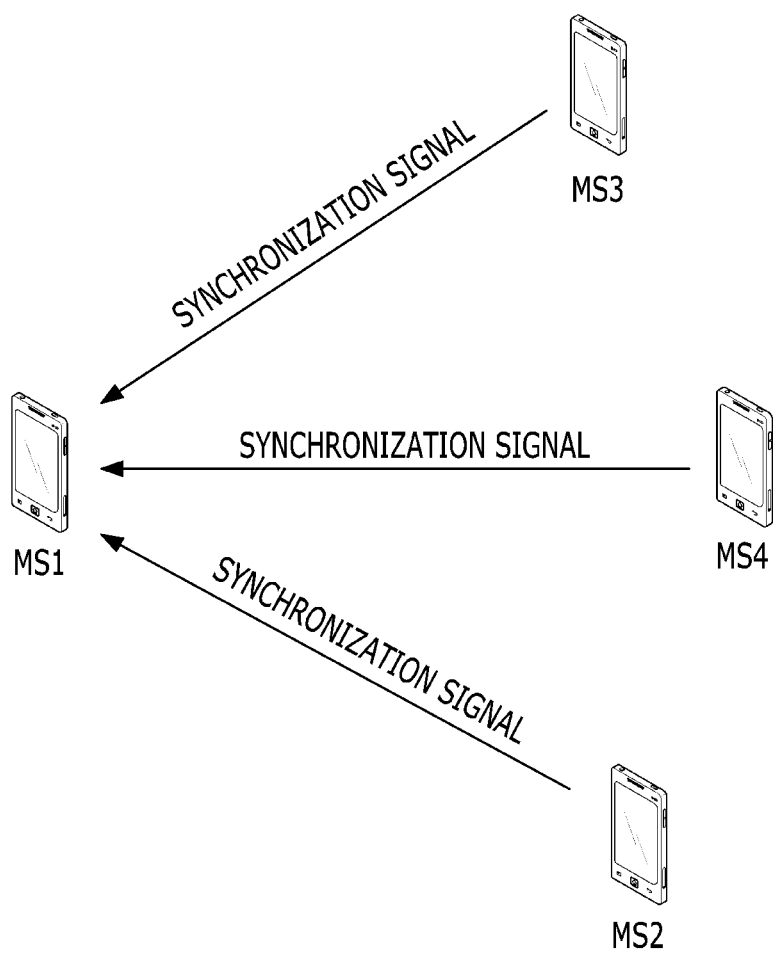
FIG. 1 shows a device-to-device direct communication according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
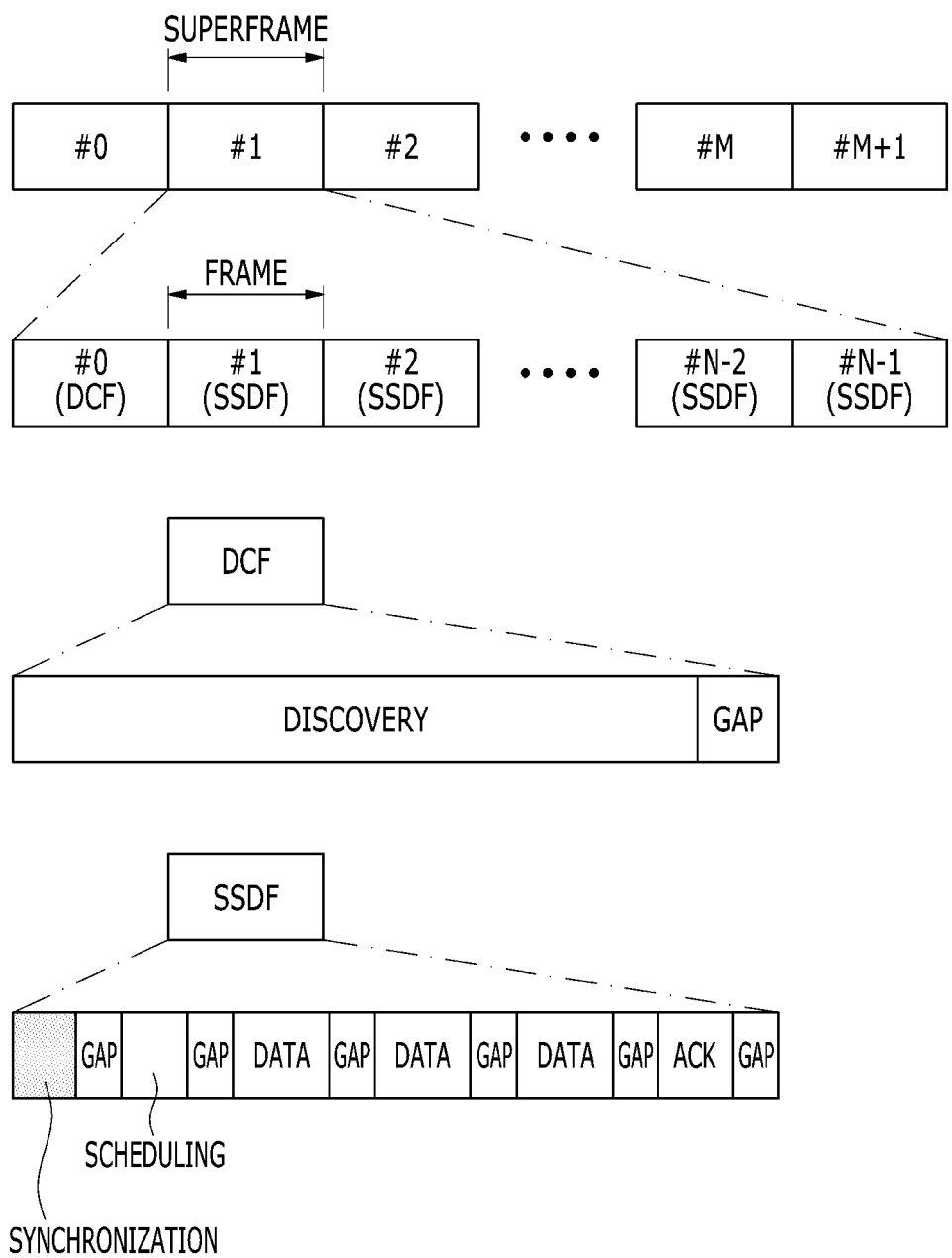
FIG. 2 shows a frame structure in a device-to-device direct communication according to an embodiment of the present invention.
Figure 3:
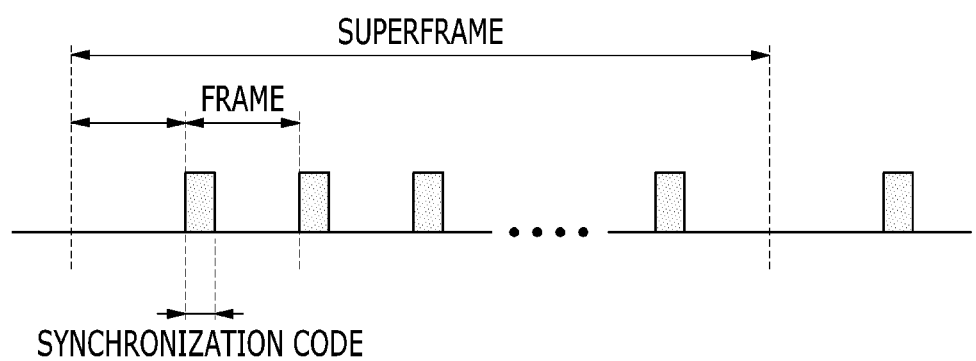
FIG. 3 shows a transmission of a synchronization signal in a frame structure shown in FIG. 2.
Figure 4:
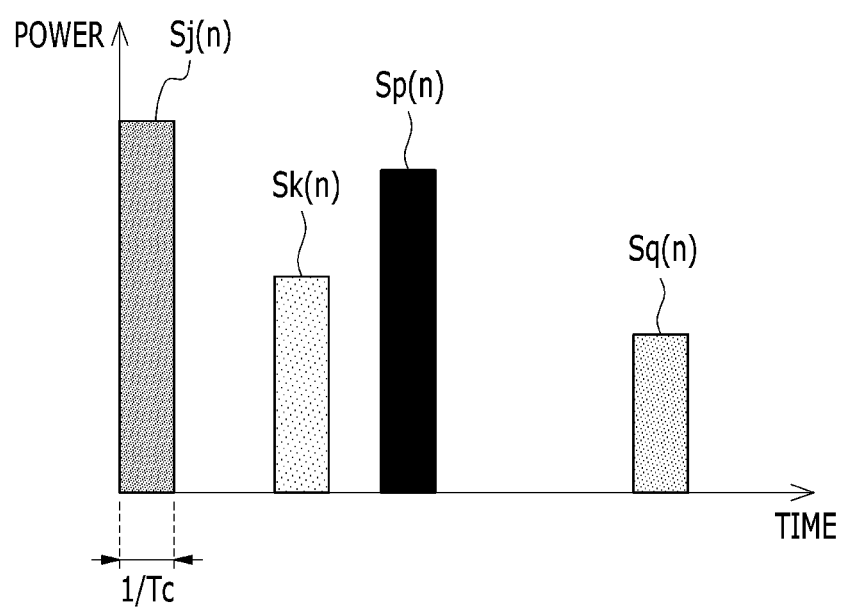
FIG. 4 shows a detection of a synchronization signal in a device-to-device direct communication according to an embodiment of the present invention.

FIG. 1 shows a device-to-device direct communication according to an embodiment of the present invention, FIG. 2 shows a frame structure in a device-to-device direct communication according to an embodiment of the present invention, FIG. 3 shows a transmission of a synchronization signal in a frame structure shown in FIG. 2, and FIG. 4 shows a detection of a synchronization signal in a device-to-device direct communication according to an embodiment of the present invention.

Referring to FIG. 1, a plurality of devices MS1, MS2, MS3, and MS4 join a device-to-device (D2D) direct communication. At a certain time, one device MS1 receives synchronization signals, and other devices MS2, MS3, and MS4 transmits the synchronization signals. The device MS1 estimations its own synchronization time based on the synchronization signals received from the other devices MS2, MS3, and MS4. For example, the devices MS1-MS4 may be peer aware communications (PAC) devices.

As shown in FIG. 2, superframes are continuously arranged in a frame structure for the D2D direct communication. The superframe includes a plurality of frames, and the frames may be classified into two kinds of frame type. The two kinds of frame type include a discovery control frame (DCF) and a synchronization, scheduling and data frame (SSDF). In one superframe, the first frame, i.e., a start frame (frame #0) may be formed as the DCF, and remaining frames may be formed as the SSDF.

The DCF is a frame for discovering neighbor devices for the D2D direct communication, and includes a discovery region. In the discovery region, the device transmits and receives a discovery signal for a device discovery. The SSDF is a frame for synchronization, resource allocation and data transmission, and includes a synchronization region for transmitting and receiving a synchronization signal, a scheduling region for the resource allocation, and a data region for the data transmission. The synchronization region is located at a predefined position of a frame, for example the head of the frame. The SSDF may further include an acknowledgement (ACK) region for transmitting an ACK or negative ACK (NACK) for an automatic repeat request (ARQ) or a hybrid ARQ (HARQ). A gap may be located at the end of the DCF or SSDF. Further, a gap may be located between the adjacent regions.

Referring to FIG. 3, since the first frame of the superframe not include the synchronization region, the device transmits or receives a synchronization signal in the remaining frames except the first frame. Because the synchronization region is located at the predefined position of the frame, the device that has received the synchronization signal from the other device can acquire frame synchronization. The device that has acquired the frame synchronization can estimate a start time of a next frame. Further, the device receives the synchronization signal every frame based on the estimated time and then estimates a synchronization time. When the device detects a frame having no synchronization signal, the device determines the detected frame as the head of the superframe. The synchronization signals having the same synchronization code may be used in all frames.

Alternatively, the synchronization signals having the different synchronization codes may be used in the frames. The device can acquire the frame synchronization and the head of the superframe using sequences of the synchronization codes. In this case, the first frame of the superframe may include the synchronization region.

According to some embodiments, a device #i may estimate (n+1)-th frame synchronization time of the device #i based on n-th frame synchronization time of the device #i and n-th frame synchronization times of other devices. The device #i may further refer received signal powers of the synchronization signals in the other devices at the n-th frame when estimating the (n+1)-th frame synchronization time. For example, the device #i may estimate the (n+1)-th frame synchronization time as expressed in Equation 1.

$$t_i(n+1) = t_i(n) + T_i + \varepsilon_0 \cdot \sum_{j=1, i \neq j}^{N} \alpha_{ij} \cdot (t_j(n) - t_i(n)) \quad \text{(Equation 1)}$$

In Equation 1, $t_i(n)$ indicates the n-th frame synchronization time of the device #i, $t_j(n)$ indicates n-th frame synchronization time of a device #j, $T_i$ indicates a frame synchronization period of a device #i, $\varepsilon_0$ indicates a loop filter coefficient, and $\alpha_{ij}$ indicates received signal power weighting factor. The $t_j(n)$ may be set as a time when the synchronization signal of the device #j is received as the n-th frame, and the $T_i$ may be equal to a length of the superframe. The $\alpha_{ij}$ may be determined as expressed in Equation 2.

$$\alpha_{ij} = \frac{P_{ij}}{\sum_{j \in I_i} P_{ij}} \quad \text{(Equation 2)}$$

In Equation 2, $P_{ij}$ indicates the received signal power from device #j to the device #i, and $I_i$ may be determined as expressed in Equation 3.

$$I_i = \{j : P_{ij} > P_0\} \quad \text{(Equation 3)}$$

In Equation 3, $P_0$ indicates a received signal power threshold. That is, the $I_i$ is an index set of devices that have transmitted the synchronization signals whose received signal power exceeds the received signal power threshold.

As shown in FIG. 4, the device #i can calculate the n-th frame synchronization time $t_j(n)$ of the device #j and the received signal power $P_{ij}$ of a signal $s_j(n)$ received from the device #j based on the signal $s_j(n)$, i.e., the synchronization signal received from the device #j. It is shown in FIG. 4 that a code having the characteristic for capable of detecting one-chip ($1/T_c$) delay is used for the synchronization signal and the synchronization signals $s_j(n)$, $s_k(n)$, $s_p(n)$, and $s_q(n)$ are received from four devices.

As described above, according to an embodiment of the present invention, all device can repeat a procedure for estimating the (n+1)-th frame synchronization time based on the synchronization signals received from the other devices at the n-th frame, thereby synchronizing the synchronization time.

Figure 5:
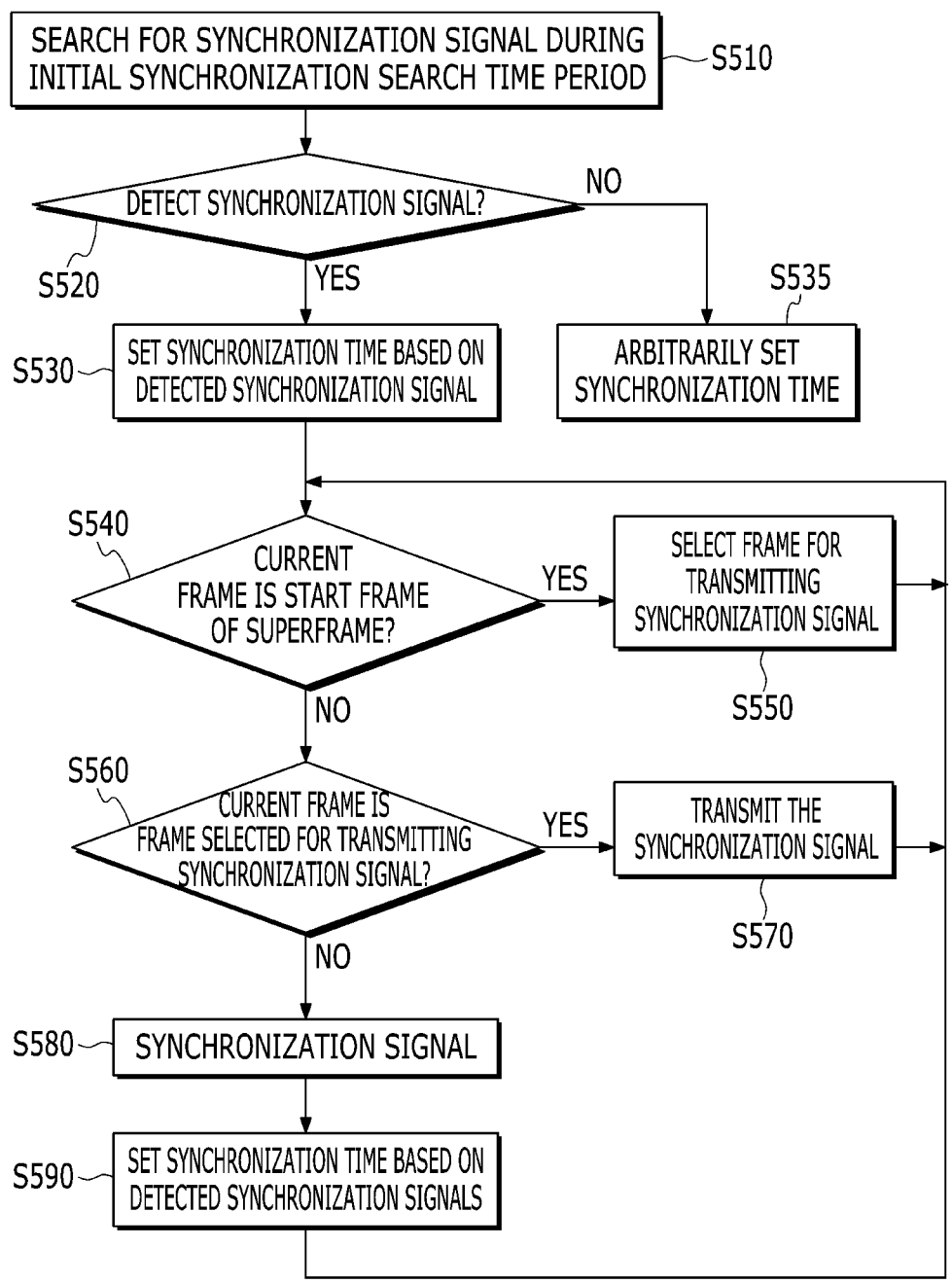
FIG. 5 is a flowchart of a synchronization method in a device-to-device direct communication according to an embodiment of the present invention.

FIG. 5 is a flowchart of a synchronization method in a D2D direct communication according to an embodiment of the present invention.

Referring to FIG. 5, when each device performs an initial entry for a direct communication network, each device searches for a synchronization signal during a certain time period, i.e., an initial synchronization search time period (S510). When succeeding in detecting the synchronization signal (S520), the device sets a synchronization time based on the detected synchronization signal (S530).

When failing to detect the synchronization signal (S520), the device determines that the direct communication network is not configured around the device, and arbitrarily sets the synchronization time (S535).

After setting the synchronization time, the device performs a synchronization signal detecting procedure within a certain range from a frame start time. The certain range may be a range corresponding to a synchronization region of the frame, and is referred to as a synchronization signal detecting period.

The device determines whether a current frame is a start frame (i.e., the first frame) of the superframe at a start time of the synchronization signal detecting period (S540). The start frame of the superframe includes no synchronization signal in a frame structure exemplified in FIG. 3. Therefore, the device does not detect the synchronization signal and selects a frame for transmitting its own synchronization signal, at the start frame of the superframe (S550). When the current frame is not the start frame of the superframe (S540), the device determines whether the current frame is the frame selected for transmitting the synchronization signal (S560). If the current frame is the frame selected for transmitting the synchronization signal, the device transmits the synchronization signal (S570). If the current frame is not the frame selected for transmitting the synchronization signal, the device detects the synchronization signals from other devices (S580), and sets a synchronization time of a next frame based on the detected synchronization signals (S590).

Next, when the synchronization signal detecting period of the next frame starts, the device repeats the synchronization signal detecting procedure S540-S590.

Each device repeats the synchronization signal detecting procedure S540-S590 such that all the devices can synchronize the synchronization time in a distributed manner. Accordingly, since any one device does not have to be a master, the load cannot be concentrated on one device and can be distributed. Further, the devices do not need to compete for being the master such that a waste of resources consumed by the competition can be prevented.

Next, a synchronization apparatus for performing a synchronization method in a D2D direct communication according to an embodiment of the present invention is described with reference to FIG. 6.

Figure 6:
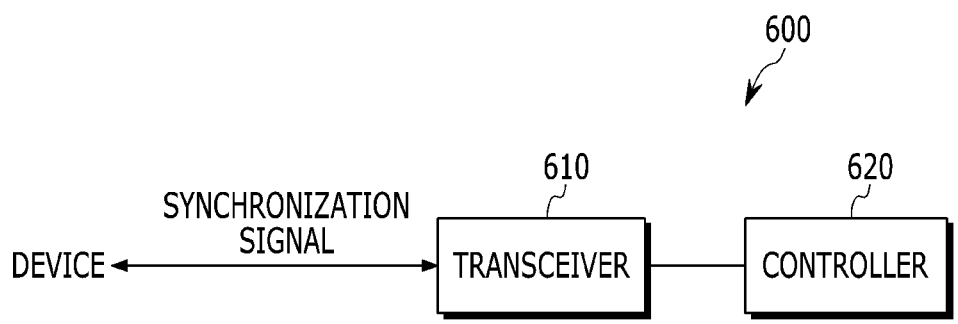
FIG. 6 is a block diagram of a synchronization apparatus in a device-to-device direct communication according to an embodiment of the present invention.

FIG. 6 is a block diagram of a synchronization apparatus in a D2D direct communication according to an embodiment of the present invention.

Referring to FIG. 6, a synchronization apparatus 600 includes a transceiver 610 and a controller 620.

The transceiver 610 transmits a synchronization signal or receives synchronization signals from other devices, in a synchronization region. The controller 620 performs a synchronization signal detecting procedure. The controller 620 detects the synchronization signals from the other devices, and estimates a synchronization time of a next frame based on the detected synchronization signals.

The synchronization apparatus 600 may be included in a device, or may be the device itself.

At least part function of a synchronization method or apparatus according to an embodiment of the present invention may be implemented by hardware or software combined with the hardware. For example, a processor such as a central processing unit (CPU), other chipset, or a microprocessor may perform a function of a controller 620, and a physical transceiver may perform a function of a transceiver 610.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A synchronization method by one device in a device-to-device direct communication, the method comprising:
   receiving synchronization signals sent from a plurality of other devices to the one device; and
   detecting a synchronization time from the synchronization signal in an incoming current frame sent from one of the other devices to the one device;

detecting whether the power of the synchronization signal in the incoming current frame sent from said one of the other devices to the one device exceeds a threshold; and estimating a synchronization time for receiving a next incoming frame to be sent from said one of the other devices to the one device using estimation information that includes the detected synchronization time and the power of a synchronization signal whose power exceeds the threshold.

2. The method of claim 1, wherein the estimation information further comprises a synchronization time detected from a synchronization signal in an outgoing current frame to be transmitted by the one device to said one of the other devices.

3. The method of claim 2, wherein the estimation information further comprises a frame synchronization period of the one device.

4. The method of claim 1, wherein estimating the synchronization time comprises estimating the synchronization time for receiving the next incoming frame sent from said one of the other devices to the one device as expressed in a below equation:

$$t_i(n) + T_i + \varepsilon_0 \cdot \sum_{j=1, i \neq j}^{N} \alpha_{ij} \cdot (t_j(n) - t_i(n)),$$

wherein $t_i(n)$ indicates a synchronization time detected from a synchronization signal in an outgoing current frame to be transmitted by the one device to said one of the other devices, $t_j(n)$ indicates a synchronization time detected from a synchronization signal in an incoming current frame sent to the one device from one of the other devices with an index j, $T_i$ indicates a frame synchronization period of the one device, $\varepsilon_0$ indicates a loop filter coefficient, and $\alpha_{ij}$ indicates power weighting factor.

5. The method of claim 4, wherein the power weighting factor is determined as $$\frac{P_{ij}}{\sum_{j \in I_i} P_{ij}},$$

wherein $P_{ij}$ indicates the power of a synchronization signal sent from said one of the other devices having the index j to the one device, and $I_i$ indicates an index set of devices, each of which has transmitted synchronization signals whose power exceeds the threshold.

6. A synchronization method by a device in a device-to-device direct communication, the method comprising:

determining a start frame in a superframe from among an outgoing current frame to be transmitted by one device to a plurality of other devices and incoming current frames received by said one device from the other devices, setting each of the outgoing frames to and incoming frames from the other devices other than the start frame of the superframe, as a synchronization frame for transmitting a synchronization signal;

detecting a synchronization time from a synchronization signal in an incoming current frame that is the synchronization frame sent from one of the other devices to the one device;

detecting whether the power of the synchronization signal in the incoming current frame that is the synchronization frame sent from said one of the other devices to the one device exceeds a threshold;

estimating a synchronization time for receiving a next incoming frame to be sent from said one of the other devices to the one device using estimation information that includes the detected synchronization time and the power of the synchronization signal whose power exceeds the threshold; and transmitting a synchronization signal including the estimated synchronization time by an outgoing synchronization frame by the one device to said one of the other devices.

7. The method of claim 6, wherein each of remaining frames except the start frame in the superframe comprises a synchronization region for transmitting the synchronization signal to the other devices or receiving the synchronization signals from the other devices.

8. The method of claim 6, wherein the estimation information further comprises a synchronization time detected from the synchronization signal in the outgoing current frame to be transmitted by the one device to said one of the other devices.

9. The method of claim 8, wherein the estimation information further comprises a frame synchronization period of the one device.

10. The method of claim 9, wherein the frame synchronization period is equal to a length of the superframe.

11. A synchronization apparatus of one device in a device-to-device direct communication, the apparatus comprising:

a transceiver to receive synchronization signals in current incoming frames sent from a plurality of other devices; and a controller
to detect a synchronization time from synchronization signal in an incoming current frame sent from one of the other devices,
to detect whether the power of the synchronization signal in the incoming current frame sent from said one of the other devices exceeds a threshold, and
to estimate a synchronization time for receiving a next incoming frame to be sent from said one of the other devices using estimation information that includes the detected synchronization time and the power of a synchronization signal whose power exceeds the threshold.

12. The apparatus of claim 11, wherein the estimation information further comprises a synchronization time detected from a synchronization signal in an outgoing current frame to be transmitted to said one of the other devices.

13. The apparatus of claim 12, wherein the estimation information further comprises a frame synchronization period of the one device.

14. The apparatus of claim 11, wherein the transceiver receives the synchronization signals of all of incoming frames except one incoming frame that is a start frame in a superframe.

* * * * *